US012630442B2

(12) United States Patent
Wan et al.

(10) Patent No.:    US 12,630,442 B2
(45) Date of Patent:        May 19, 2026

(54) LITHIUM-RICH CARBONATE PRECURSOR, PREPARATION METHOD THEREFOR, AND APPLICATION THEREOF

(71) Applicant: SVolt Energy Technology Company Limited, Changzhou (CN)

(72) Inventors: Jiangtao Wan, Changzhou (CN); Yongjie Zhang, Changzhou (CN); Haipeng Ren, Changzhou (CN); Ning Zhang, Changzhou (CN); Jinxin Zhu, Changzhou (CN); Pengfei Wang, Changzhou (CN); Zitan Li, Changzhou (CN)

(73) Assignee: SVolt Energy Technology Co., Ltd., Changzhou (CN)

( * ) Notice: Subject to any disclaimer, the term of this patent is extended or adjusted under 35 U.S.C. 154(b) by 811 days.

(21) Appl. No.: 17/780,957

(22) PCT Filed: Oct. 26, 2020

(86) PCT No.: PCT/CN2020/123614
§ 371 (c)(1),
(2) Date: May 27, 2022

(87) PCT Pub. No.: WO2021/103885
PCT Pub. Date: Jun. 3, 2021

(65) Prior Publication Data
US 2023/0002243 A1      Jan. 5, 2023

(30) Foreign Application Priority Data
Nov. 29, 2019    (CN) .......................... 201911203426.6

(51) Int. Cl.
*C01G 53/50*        (2025.01)
*C01G 53/82*        (2025.01)
*H01M 10/052*       (2010.01)

(52) U.S. Cl.
CPC ............. *C01G 53/50* (2013.01); *C01G 53/82* (2025.01); *H01M 10/052* (2013.01);
(Continued)

(58) Field of Classification Search
CPC ....... C01G 53/50; C01G 53/82; H01M 4/505; H01M 4/485; H01M 4/525; H01M 10/052;
(Continued)

(56) References Cited

U.S. PATENT DOCUMENTS

2017/0317344 A1    11/2017  Tan et al.
2019/0020025 A1*    1/2019  Matsumoto ............ C01G 53/06

FOREIGN PATENT DOCUMENTS

CN        101982421 A      3/2011
CN        106328922 A      1/2017
(Continued)

OTHER PUBLICATIONS

International Search Report dated Feb. 2, 2021, in connection with International Application No. PCT/CN2020/123614.
(Continued)

*Primary Examiner* — Kiran Quraishi Akhtar
(74) *Attorney, Agent, or Firm* — Wolf, Greenfield & Sacks, P.C.

(57)        ABSTRACT

A lithium-rich carbonate precursor, a preparation method therefor, and an application thereof. The lithium-rich carbonate precursor has a solid spherical structure, and the chemical formula of the lithium-rich carbonate precursor is $Ni_xCo_yMn_{(1-x-y)}CO_3$. The precursor has the advantages of having controllable particle size, uniform particle size distribution, high sphericity, high tap density, good fluidity, and excellent electrochemical performance and energy density.

11 Claims, 2 Drawing Sheets

(52) U.S. Cl.
CPC ....... *C01P 2004/61* (2013.01); *C01P 2006/11* (2013.01); *C01P 2006/40* (2013.01); *H01M 2220/20* (2013.01)

(58) Field of Classification Search
CPC ....... H01M 10/0525; H01M 2004/028; H01M 2220/20; C01P 2004/61; C01P 2006/11; C01P 2006/40; C01P 2004/03; C01P 2004/32; Y02E 60/10
See application file for complete search history.

(56) References Cited

FOREIGN PATENT DOCUMENTS

| | | | |
|---|---|---|---|
| CN | 106340638 | A | 1/2017 |
| CN | 103187565 | B | 8/2017 |
| CN | 105 489 842 | B | 3/2018 |
| CN | 107968198 | A | 4/2018 |
| CN | 108054371 | A | 5/2018 |
| CN | 108432002 | A | 8/2018 |
| CN | 108463911 | A | 8/2018 |
| CN | 109279661 | A | 1/2019 |
| CN | 109686946 | A | 4/2019 |
| CN | 110364714 | A | 10/2019 |
| CN | 110 233 257 | B | 1/2020 |
| CN | 108 298 599 | B | 5/2020 |
| CN | 111422918 | A | 7/2020 |
| CN | 111430701 | A | 7/2020 |
| CN | 108 557 905 | B | 4/2021 |
| CN | 107 579 236 | B | 11/2021 |
| JP | 2016-069209 | A | 5/2016 |
| JP | 2019-160523 | A | 9/2019 |
| WO | WO-2017/119459 | * | 7/2017 ............ H01M 4/505 |

OTHER PUBLICATIONS

Chinese Office Action dated Oct. 28, 2021, in connection with Chinese Application No. 201911203426.6.
Extended European Search Report dated Sep. 28, 2023, in connection with European Application No. 20893215.2.

* cited by examiner

LITHIUM-RICH CARBONATE PRECURSOR, PREPARATION METHOD THEREFOR, AND APPLICATION THEREOF

CROSS-REFERENCES TO RELATED APPLICATIONS

This is a National Stage Application, filed under 35 U.S.C. 371, of International Patent Application No. PCT/CN2020/123534, filed on Oct. 26, 2020, which is based on and claims priority to Chinese Patent Application No. 201911203407.3 filed with the China National Intellectual Property Administration (CNIPA) on Nov. 29, 2019, the disclosure of which is incorporated herein by reference in its entirety.

TECHNICAL FIELD

The present disclosure relates to the field of lithium batteries, for example, to a lithium-rich carbonate precursor, a preparation method therefor, and an application thereof.

BACKGROUND

With the continuous expansion of the application field of lithium-ion batteries, the application of lithium-ion batteries in the field of new energy vehicles has been widely favored in recent years, while the demand for lithium-ion batteries with high energy density is becoming more and more urgent. Lithium-rich manganese-based cathode materials have great potential due to their advantages of large specific discharge capacity, low price, and environmental friendliness. At present, lithium-rich materials generally have some defects, such as fine particles, low sphericity, low tap density, poor cycle performance, and poor rate performance.

Therefore, lithium-rich carbonate precursors with high sphericity and tap density need further study.

SUMMARY

The present disclosure provides a lithium-rich carbonate precursor, a preparation method therefor, and an application thereof.

The present disclosure provides a lithium-rich carbonate precursor in an embodiment. The lithium-rich carbonate precursor has a solid spherical structure and has a chemical formula of $Ni_xCo_yMn_{(1-x-y)}CO_3$, wherein x is 0.1 to 0.25, such as 0.1, 0.11, 0.12, 0.13, 0.14, 0.15, 0.16, 0.17, 0.18, 0.19, 0.20, 0.21, 0.22, 0.23, 0.24 or 0.25, etc., and y is 0.1 to 0.25, such as 0.1, 0.11, 0.12, 0.13, 0.14, 0.15, 0.16, 0.17, 0.18, 0.19, 0.20, 0.21, 0.22, 0.23, 0.24 or 0.25, etc.

The lithium-rich carbonate precursor provided by the embodiment of the present disclosure has a solid spherical structure with small particle size and has the advantages of controllable particle size, uniform particle size distribution, high sphericity, high tap density, good fluidity, excellent electrochemical performance, and excellent energy density. The lithium-rich carbonate precursor can be stably produced in both the ammonia system and the ammonia-free system, especially in the ammonia-free system, and the production does not generate ammonia-containing wastewater and is environmentally friendly. Meanwhile, the cathode material prepared by adopting the precursor has a high compaction density, large specific capacity, excellent circulation performance, and excellent electrochemical discharge performance. Nickel-cobalt is an auxiliary component to stabilize the structure of the lithium-rich material. If the content of nickel-cobalt is too high, the lithium ions of the lithium-rich material cannot be well intercalated during the preparation of the cathode material, which affects the performance of the cathode material.

In an embodiment, the precursor has a particle size of 3 μm to 6 μm, such as 3 μm, 4 μm, 5 μm or 6 μm, etc., and has a tap density of not less than 1.47 g/cm³, such as 1.48 g/cm³, 1.49 g/cm³, 1.50 g/cm³, 1.51 g/cm³, 1.52 g/cm³, 1.53 g/cm³, 1.54 g/cm³, 1.55 g/cm³, 1.56 g/cm³, 1.57 g/cm³ or 1.58 g/cm³, etc.

In the embodiment of the present disclosure, the particle size refers to the average particle size, and only the lithium-rich precursor within the particle size range can be applied to preparing the solid-state battery cathode material, and the material has a wider application range, while the large-particle precursor can only be used in the current power battery field, and the application range is narrower.

The present disclosure provides a method for preparing the above-mentioned precursor in an embodiment. The method includes the following steps:

(1) mixing a soluble nickel salt, a soluble cobalt salt, and a soluble manganese salt to obtain a mixed metal salt;

(2) mixing part of the mixed metal salt with a precipitating agent in the presence of a protective agent and a conductive agent, performing stirring at a predetermined temperature according to a predetermined stirring speed, lowering the temperature to a normal temperature, and sealing the mixture and allowing to stand, so as to obtain preformed particles;

(3) with stirring, mixing the preformed particles, another part of the mixed metal salt, and the precipitating agent to perform a co-precipitation reaction to obtain a reacted liquid;

(4) with stirring, mixing the reacted material and a detergent to obtain a primary washed material;

(5) performing primary dehydration on the primary washed material to obtain a primary dehydrated material;

(6) with stirring, performing second washing and dehydration on the primary dehydrated material respectively to obtain a secondary dehydrated material; and (7) drying the secondary dehydrated material, and sieving the dried secondary dehydrated material to remove iron to obtain a lithium-rich carbonate precursor.

In the method for preparing a lithium-rich carbonate precursor provided by the embodiment of the present disclosure, a mixed metal salt containing a soluble nickel salt, a soluble cobalt salt, and a soluble manganese salt is mixed with a precipitating agent in the presence of a protective agent and a conductive agent to prepare solid preformed particles of small particles, then the preformed particles, the mixed metal salt, and the precipitating agent are mixed, that is, the co-precipitation reaction is performed with solid preformed particles of small particles as seed crystal, and finally, after subsequent processes of washing, dehydration, drying, sieving and iron removal, the above-mentioned lithium-rich carbonate precursor with a solid spherical structure, controllable particle size, uniform particle size distribution, high sphericity, high tap density, good fluidity, excellent electrochemical performance, and high energy density may be prepared.

Moreover, the lithium-rich carbonate precursor can be stably produced in both the ammonia system and the ammonia-free system, especially in the ammonia-free system, and the production does not generate ammonia-containing wastewater and is environmentally friendly. Meanwhile, the cathode material prepared by adopting the precursor prepared by the method has a high compaction density, large specific capacity, excellent circulation performance, and excellent electrochemical discharge performance.

In step (2) provided by the embodiment of the present disclosure, part of the mixed metal salt obtained in step (1) is mixed with a precipitating agent in the presence of a protective agent and a conductive agent, wherein the mixed metal salt rapidly reacts with the precipitating agent, and then the mixture is stirred at a predetermined temperature according to a predetermined stirring speed, finally cooled to the normal temperature, sealed and allowed to stand, so as to obtain solid preformed particles of small particles. In the presence of the protective agent, the system can be prevented from being oxidized, and with the addition of the conductive agent, the conductivity of the lithium-rich material can be improved. The mixed metal salt and the precipitating agent are mixed, rapidly reacted (the reaction is completed within 10 seconds), then stirred at a predetermined temperature and a predetermined stirring speed, finally cooled to the normal temperature, sealed and allowed to stood. The system can become homogenous through rapid mixing, stirring, and dispersion in the early stage, and then the homogenous particles are self-grown into spherical-like seed crystals in the static environment to obtain solid preformed particles.

In step (3) provided by the embodiment of the present disclosure, the preformed particles obtained in step (2) are added into a reaction kettle as a base solution, and then, with stirring, another part of the mixed salt obtained in step (1) and a precipitating agent are added into the reaction kettle and mixed to perform the co-precipitation reaction, that is, the co-precipitation reaction is performed with the solid preformed particles of small particles as seed crystals, to obtain a reacted liquid. Through the co-precipitation reaction with the solid preformed particles of small particles as seed crystals, the precipitated particles generated after the reaction between the added mixed salt and the precipitating agent are deposited on the surface of the preformed particles, the growth of crystals becomes regular and orderly, the particle size distribution also follows the particle size distribution of seed crystals, and thus the morphology and particle size of the product are well controlled, which facilitates obtaining the precursor with a uniform particle size distribution, high sphericity, high tap density, and good fluidity.

In step (4) provided by the embodiment of the present disclosure, the used detergent is a conventional detergent in the art, such as a sodium hydroxide solution with a pH of 9.0, and it is to be noted that those skilled in the art can choose the amount of the detergent and the stirring speed and time according to actual needs, as long as part of sodium and sulfur in the reacted material can be removed.

In step (5) provided by the embodiment of the present disclosure, the primary dehydration is performed on the primary washed material to obtain a primary dehydrated material, wherein the primary dehydration is performed by a centrifuge, and the water content of the obtained primary dehydrated material is not higher than 10 wt %.

In step (6) provided by the embodiment of the present disclosure, the secondary washing is performed on the primary dehydrated material by using pure water to further remove impurities such as sodium and sulfur in the primary dehydrated material, and those skilled in the art can choose the amount of pure water and the stirring speed and time according to actual needs, as long as the primary dehydrated material is washed until the sodium and sulfur contents are qualified, wherein the dehydration is performed by a centrifuge, and the water content in the obtained secondary dehydrated material is not higher than 10 wt %.

In an embodiment, in step (1), the soluble nickel salt, the soluble cobalt salt, and the soluble manganese salt are in a molar ratio of (0.1 to 0.25):(0.1 to 0.25):(0.5 to 0.8) according to nickel, cobalt, and manganese, such as 0.1:0.1:0.8, 0.15:0.12:0.73, 0.2:0.2:0.6 or 0.25:0.25:0.5, etc.

In an embodiment, in step (1), the soluble nickel salt, the soluble cobalt salt, and the soluble manganese salt in the mixed metal salt are each independently at a concentration of 80 g/L to 130 g/L, such as 80 g/L, 85 g/L, 90 g/L, 95 g/L, 100 g/L, 105 g/L, 110 g/L, 115 g/L, 120 g/L, 125 g/L or 130 g/L, etc.

In an embodiment, in step (1), the soluble nickel salt is at least one selected from the group consisting of nickel chloride, nickel nitrate, and nickel sulfate.

In an embodiment, in step (1), the soluble cobalt salt is at least one selected from the group consisting of cobalt chloride, cobalt nitrate, and cobalt sulfate.

In an embodiment, in step (1), the soluble manganese salt is at least one selected from the group consisting of manganese chloride, manganese nitrate, and manganese sulfate.

In an embodiment, in step (2), the protective agent is at least one selected from the group consisting of ascorbic acid and sodium sulfite.

In an embodiment, in step (2), the conductive agent is at least one selected from the group consisting of glucose and fructose.

In an embodiment, in step (2), the mixed metal salt and the precipitating agent are in a molar ratio of 1:(2.0 to 3.5), such as 1:2, 1:2.1, 1:2.2, 1:2.3, 1:.4, 1:.5, 1:.6, 1:.7, 1:.8, 1:2.9, 1:3.0, 1:3.1, 1:3.2, 1:3.3, 1:3.4 or 1:3.5, etc.

In an embodiment, in step (2), based on 1 L of the total amount of the mixed metal salt and the precipitating agent, the protective agent is used in an amount of 1 g to 20 g, such as 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g or 20 g, etc., and the conductive agent is used in an amount of 10 g to 100 g, such as 10 g, 20 g, 30 g, 40 g, 50 g, 60 g, 70 g, 80 g, 90 g or 100 g, etc.

In an embodiment, in step (2), the precipitating agent is at least one selected from the group consisting of sodium carbonate, sodium bicarbonate, ammonium carbonate, and ammonium bicarbonate.

In an embodiment, the precipitating agent further comprises ammonia water.

In an embodiment, the sodium carbonate is at a concentration of 50 g/L to 200 g/L, such as 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, the sodium bicarbonate is at a concentration of 50 g/L to 100 g/L, such as 50 g/L, 55 g/L, 60 g/L, 65 g/L, 70 g/L, 75 g/L, 80 g/L, 85 g/L, 90 g/L, 95 g/L or 100 g/L, etc.

In an embodiment, the ammonium carbonate is at a concentration of 150 g/L to 200 g/L, such as 150 g/L, 155 g/L, 160 g/L, 165 g/L, 170 g/L, 175 g/L, 180 g/L, 185 g/L, 190 g/L, 195 g/L or 200 g/L, etc.

In an embodiment, the ammonium bicarbonate is at a concentration of 50 g/L to 200 g/L, such as 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, the ammonia water is at a concentration of 50 g/L to 200 g/L, such as 50 g/L, 60 g/L, 70 g/L, 80 g/L, 90 g/L, 100 g/L, 110 g/L, 120 g/L, 130 g/L, 140 g/L, 150 g/L, 160 g/L, 170 g/L, 180 g/L, 190 g/L or 200 g/L, etc.

In an embodiment, in step (2), the predetermined temperature is 30° C. to 60° C., such as 30° C., 35° C., 40° C., 45° C., 50° C., 55° C. or 60° C., etc., the predetermined stirring speed is 800 rpm to 1000 rpm, such as 800 rpm, 820 rpm, 840 rpm, 860 rpm, 880 rpm, 900 rpm, 920 rpm, 940 rpm, 960 rpm, 980 rpm or 1000 rpm, etc., and the predetermined stirring is performed for 1 hour to 5 hours, such as 1 hour, 2 hours, 3 hours, 4 hours or 5 hours, etc.

In an embodiment of the present disclosure, the predetermined temperature is 30° C. to 60° C., the material is oxidized if the predetermined temperature is too high while the high-temperature collision effect of particles is insufficient if the temperature is too low, and the stirring speed within this range can ensure the dispersion uniformity of the system.

In an embodiment, in step (2), the standing is performed for 12 hours to 24 hours, such as 12 hours, 13 hours, 14 hours, 15 hours, 16 hours, 17 hours, 18 hours, 19 hours, 20 hours, 21 hours, 22 hours, 23 hours or 24 hours, etc.

In an embodiment, in step (2), the preformed particles have a particle size of 1 μm to 3 μm, such as 1.0 1.5 2.0 2.5 μm or 3.0 etc.

In an embodiment, in step (3), the preformed particles, the mixed metal salt, and the precipitating agent are in a mass ratio of 1:(2 to 8):(6 to 20), such as 1:2:6, 1:3:7, 1:4:9, 1:6:10, 1:7:15 or 1:8:20, etc.

In an embodiment, in step (3), the stirring is performed at a rotational speed of 400 rpm to 1000 rpm, such as 400 rpm, 500 rpm, 600 rpm, 700 rpm, 800 rpm, 900 rpm or 1000 rpm, etc., and at a temperature of 50° C. to 70° C. such as 50° C., 52° C., 54° C., 56° C., 58° C., 60° C., 62° C., 64° C., 66° C., 68° C. or 70° C., etc., for 5 hours to 60 hours, such as 5 hours, 10 hours, 15 hours, 20 hours, 25 hours, 30 hours, 35 hours, 40 hours, 45 hours, 50 hours, 55 hours or 60 hours, etc., the reacted liquid has a pH of 8 to 9.5, such as 8.0, 8.1, 8.2, 8.3, 8.4, 8.5, 8.6, 8.7, 8.8, 8.9, 9.0, 9.1, 9.2, 9.3, 9.4 or 9.5, etc., and the solid content of the reacted liquid is 100 g/L to 300 g/L, such as 100 g/L, 120 g/L, 140 g/L, 160 g/L, 180 g/L, 200 g/L, 220 g/L, 240 g/L, 260 g/L, 280 g/L or 300 g/L, etc.

The present disclosure provides a method for preparing a cathode material in an embodiment, comprising:

(a) mixing a precursor material with a lithium salt to perform primary sintering to obtain a primary sintered material; and (b) crushing the primary sintered material and performing secondary sintering on the crushed primary sintered material to obtain a cathode material.

In step (a), the precursor material is the lithium-rich carbonate precursor described in an embodiment or a lithium-rich carbonate precursor prepared by the method described in an embodiment.

In the method for preparing a cathode material provided by the embodiment of the present disclosure, the above-mentioned lithium-rich carbonate precursor with a solid spherical structure, controllable particle size, uniform particle size distribution, high sphericity, high tap density, good fluidity, excellent electrochemical performance, and excellent energy density is mixed with the lithium salt, and then the primary sintering and secondary sintering are performed, in which the lithium-rich carbonate precursor is decomposed during the primary sintering, and then lithium ions are migrated into the precursor during the second sintering, so as to prepare the cathode material with a high compaction density (not less than 2.9 g/cm³), high specific capacity, excellent cycle performance, and excellent electrochemical discharge performance.

In an embodiment, in step (a), the precursor material and the lithium salt are in a molar ratio of 1:(1.02 to 1.08), such as 1:1.02, 1:1.03, 1:1.04, 1:1.05, 1:.06, 1:1.07 or 1:1.08, etc.

In an embodiment, in step (a), the primary sintering is performed at a temperature of 400° C. to 600° C., such as 400° C., 420° C., 460° C., 480° C., 500° C., 520° C., 540° C., 560° C., 580° C. or 600° C., etc., for 4 hours to 6 hours, such as 4.0 hours, 4.2 hours, 4.4 hours, 4.6 hours, 4.8 hours, 5.0 hours, 5.2 hours, 5.4 hours, 5.6 hours, 5.8 hours or 6.0 hours, etc.

In an embodiment, in step (b), the secondary sintering is performed at a temperature of 700° C. to 950° C., such as 700° C., 750° C., 800° C., 850° C., 900° C. or 950° C., etc., for 8 hours to 25 hours, such as 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours or 25 hours, etc.

The present disclosure provides a cathode material in an embodiment. The cathode material is prepared by the method described in an embodiment.

The cathode material provided by the embodiment of the present disclosure has a high compaction density (not less than 2.9 g/cm³), high specific capacity, excellent cycle performance, and excellent electrochemical performance.

In an embodiment, the cathode material has a chemical formula of $Li(Li_{0.2}Ni_aCo_bMn_{(0.8-a-b)})O_2$, wherein a is 0.08 to 0.18, such as 0.08, 0.09, 0.1, 0.11, 0.12, 0.13, 0.14, 0.15, 0.16, 0.17 or 0.18, etc., and b is 0.08 to 0.18, such as 0.08, 0.09, 0.1, 0.11, 0.12, 0.13, 0.14, 0.15, 0.16, 0.17 or 0.18, etc.

The present disclosure provides a lithium battery in an embodiment. The lithium battery includes the cathode material described in an embodiment.

The lithium battery provided by the embodiment of the present disclosure has a long cycle life on the basis of high specific energy.

The present disclosure provides a vehicle in an embodiment. The vehicle includes the lithium battery described in an embodiment.

The vehicle provided by the embodiment of the present disclosure which is loaded with the above-mentioned lithium battery having high specific energy and long cycle life has excellent endurance and thus satisfies the use requirements of consumers.

BRIEF DESCRIPTION OF DRAWINGS

The drawings are used to provide a further understanding of the solutions of the present disclosure, constitute a part of the description, explain the solutions of the present disclosure in conjunction with the embodiments of the present application, and do not limit the solutions of the present disclosure.

DETAILED DESCRIPTION

Technical solutions of the present disclosure are further described below through specific embodiments in conjunction with the drawings.

In an embodiment, the present disclosure provides a lithium-rich carbonate precursor. The lithium-rich carbonate precursor has a solid spherical structure and has a chemical formula of $Ni_xCo_yMn_{(1-x-y)}CO_3$, wherein x is 0.1 to 0.25, and y is 0.1 to 0.25. The lithium-rich carbonate precursor has a solid spherical structure with small particle size and has the advantages of controllable particle size, uniform particle size distribution, high sphericity, high tap density, good fluidity, excellent electrochemical performance, and excellent energy density. The lithium-rich carbonate precursor can be stably produced in both the ammonia system and the ammonia-free system, especially in the ammonia-free system, and the production does not generate ammonia-containing wastewater and is environmentally friendly. Meanwhile, the cathode material prepared by adopting the precursor has a high compaction density, large specific capacity, excellent circulation performance, and excellent electrochemical discharge performance. The precursor has a particle size of 3 μm to 6 μm and a tap density of not less than 1.47 $g/cm^3$.

Figure 1:
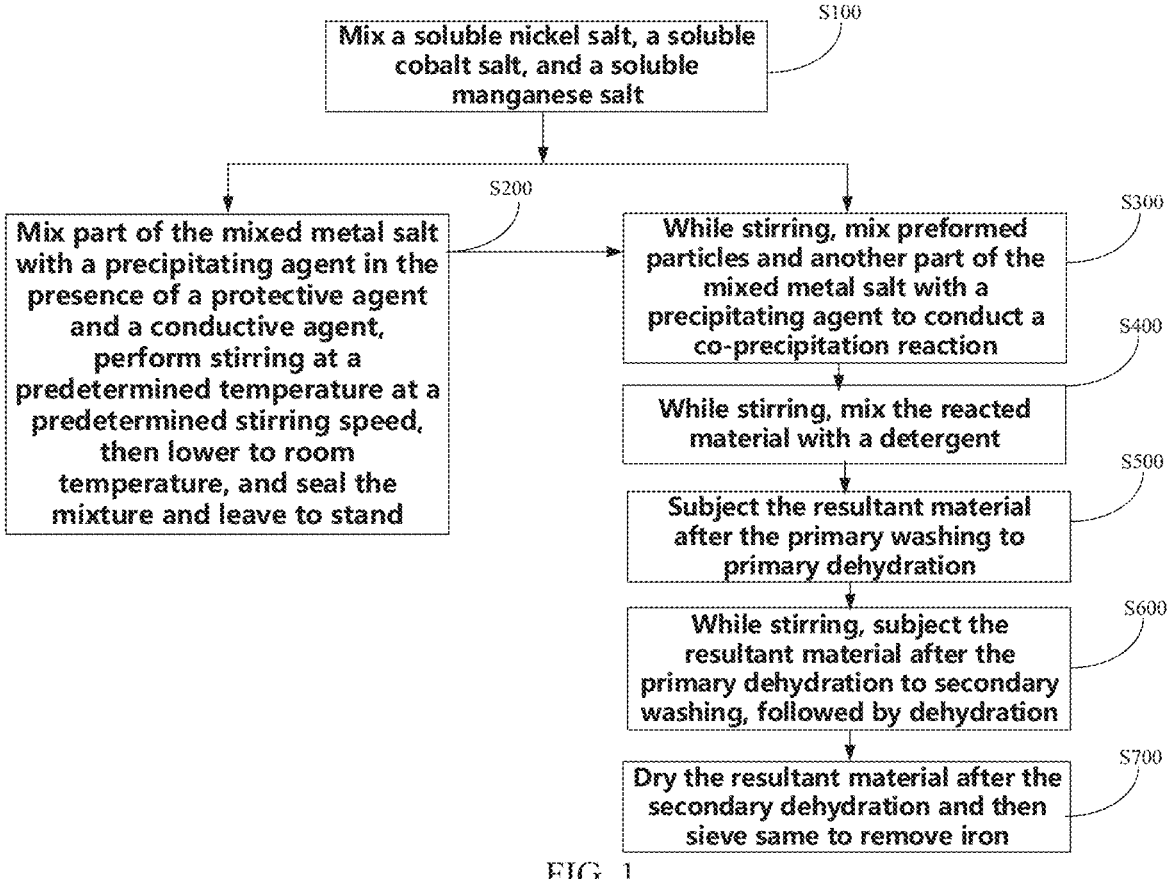
FIG. 1 is a flowchart of a method for preparing a lithium-rich carbonate precursor according to an embodiment of the present disclosure.

In an embodiment, the present disclosure provides a method for preparing the above-mentioned lithium-rich carbonate precursor. As shown in FIG. 1, the method includes the following steps.

In S100, a soluble nickel salt, a soluble cobalt salt, and a soluble manganese salt are mixed to obtain a mixed metal salt. The soluble nickel salt is at least one selected from the group consisting of nickel chloride, nickel nitrate, and nickel sulfate. The soluble cobalt salt is at least one selected from the group consisting of cobalt chloride, cobalt nitrate, and cobalt sulfate. The soluble manganese salt is at least one selected from the group consisting of manganese chloride, manganese nitrate, and manganese sulfate. The soluble nickel salt, the soluble cobalt salt, and the soluble manganese salt in the mixed metal salt are each independently at a concentration of 80 g/L to 130 g/L, and the soluble nickel salt, the soluble cobalt salt, and the soluble manganese salt are in a molar ratio of (0.1 to 0.25):(0.1 to 0.25):(0.5 to 0.8) according to nickel, cobalt, and manganese.

In S200, the mixed metal salt prepared in step S100 is mixed with a precipitating agent in the presence of a protective agent and a conductive agent, wherein the mixed metal salt rapidly reacts with the precipitating agent, and then the mixture is stirred at a predetermined temperature of 30° C. to 60° C. according to a predetermined stirring speed 800 rpm to 1000 rpm for 1 hour to 5 hours, finally cooled to the normal temperature, sealed and allowed to stand for 12 hours to 24 hours, so as to obtain solid preformed particles of small particles. The protective agent is at least one selected from the group consisting of ascorbic acid and sodium sulfite; the conductive agent is at least one selected from the group consisting of glucose and fructose; the precipitating agent is at least one selected from the group consisting of sodium carbonate, sodium bicarbonate, ammonium carbonate, and ammonium bicarbonate or is ammonia water and at least one selected from the group consisting of sodium carbonate, sodium bicarbonate, ammonium carbonate, and ammonium bicarbonate, among which ammonium bicarbonate is at a concentration of 50 g/L to 200 g/L, sodium carbonate is at a concentration of 50 g/L to 200 g/L, the ammonium carbonate is at a concentration of 150 g/L to 200 g/L, ammonium bicarbonate is at a concentration of 50 g/L to 200 g/L, and the ammonia water is at a concentration of 50 g/L to 200 g/L. The mixed metal salt and the precipitating agent are in a molar ratio of 1:(2.0 to 3.5); based on 1 L of the total amount of the mixed metal salt and the precipitating agent, the protective agent is used in an amount of 1 g to 20 g, and the conductive agent is used in an amount of 10 g to 100 g; the preformed particles have a particle size of 1 μm to 3 μm.

In S300, the preformed particles obtained in step S200 are added into a reaction kettle as a base solution, and then, with stirring, another part of the mixed salt obtained in step (1) and a precipitating agent are added into the reaction kettle and mixed to perform the co-precipitation reaction, that is, the co-precipitation reaction is performed with the solid preformed particles of small particles as seed crystals, to obtain a reacted liquid. The precipitating agent is the same as the precipitating agent used in step (2). The preformed particles, the mixed metal salt, and the precipitating agent are in a mass ratio of 1:(2 to 8):(6 to 20), the stirring is performed at a rotational speed of 400 rpm to 1000 rpm and at a temperature of 50° C. to 70° C. for 5 hours to 60 hours, the reacted liquid has a pH of 8 to 9.5, and the solid content of the reacted liquid is 100 g/L to 300 g/L.

In S400, with stirring, the reacted material obtained in step S300 and a detergent are mixed to obtain a primary washed material, in which the stirring is performed for 0.1 hour to 5 hours, and the detergent is a sodium hydroxide solution with a pH of 9.0.

In S500, primary dehydration is performed on the primary washed material obtained in step S400 to obtain a primary dehydrated material, wherein the water content of the primary dehydrated material is not higher than 10 wt %.

In S600, second washing and dehydration are performed on the primary dehydrated material obtained in step S500 respectively to obtain a secondary dehydrated material, wherein the water content of the secondary dehydrated material is not higher than 10 wt %.

In S700, the secondary dehydrated material obtained in step S600 is dried and sieved to remove iron to obtain a lithium-rich carbonate precursor.

Figure 2:
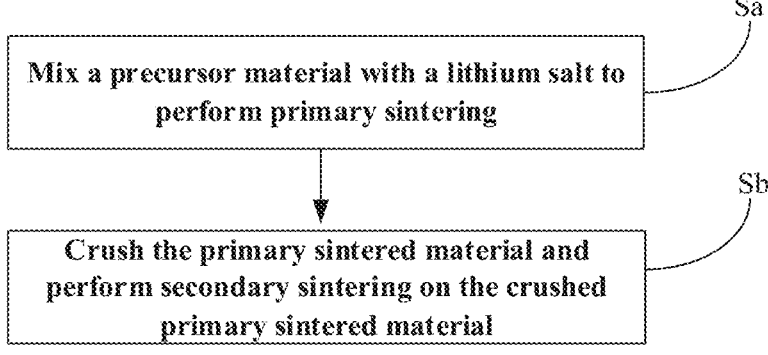
FIG. 2 is a flowchart of a method for preparing a cathode material according to an embodiment of the present disclosure.

In an embodiment, the present disclosure provides a method for preparing a cathode material. As shown in FIG. 2, the method includes the following steps.

In Sa, the precursor material prepared in the above-mentioned embodiment is mixed with a lithium salt to perform primary sintering to decompose the lithium-rich carbonate precursor, that is, to obtain a primary sintered material. The lithium salt is at least one selected from the group consisting of lithium hydroxide and lithium carbonate, the precursor material and the lithium salt are in a molar ratio of 1:(1.02 to 1.08), and the primary sintering is performed at a temperature of 400° C. to 600° C. for 4 hours to 6 hours.

In Sb, the primary sintered material obtained in step Sa is crushed, and secondary sintering is performed on the crushed primary sintered material to cause the lithium salt to be migrated into the precursor, so as to obtain a cathode material having a chemical formula of $Li(Li_{0.2}Ni_aCo_bMn_{(0.8-a-b)})O_2$, wherein a is 0.08 to 0.18, and b is 0.08 to 0.18. The secondary sintering is performed at a temperature of 700° C. to 950° C. for 8 hours to 25 hours.

In an embodiment, the present disclosure provides a cathode material. The cathode material is prepared by the above-mentioned method for preparing a lithium-rich carbonate precursor.

In an embodiment, the present disclosure provides a lithium battery. The lithium battery includes the above-mentioned cathode material.

In an embodiment, the present disclosure provides a vehicle. The vehicle includes the above-mentioned lithium battery.

Example 1

The method for preparing a lithium-rich carbonate precursor is as follows.

(1) Nickel sulfate, cobalt sulfate, and manganese sulfate in a molar ratio of 0.18:0.1:0.72 according to nickel, cobalt, and manganese were mixed to obtain a mixed metal salt in which nickel sulfate, cobalt sulfate, and manganese sulfate were at a concentration of 100 g/L.

(2) In the presence of the protective agent ascorbic acid and the conductive agent glucose, part of the mixed metal salt was mixed with an ammonia bicarbonate solution with a concentration of 100 g/L and ammonia water with a concentration of 150 g/L for rapid reaction (the reaction was completed within 10 seconds, wherein the molar ratio of the mixed metal salt to the precipitating agent was 1:2.0, and based on 1 L of the total amount of mixed metal salt and the precipitating agent, the amount of the protective agent ascorbic acid was 15 g, and the amount of the conductive agent glucose was 100 g). The obtained mixture was stirred at 40° C. and at a stirring speed of 1000 rpm for 1 hour, then cooled to the normal temperature, sealed, and allowed to stand for 24 hours to obtain solid preformed particles with a particle size of 3 μm.

(3) The obtained preformed particles were added into a reaction kettle as a base solution, and then the mixed metal salt obtained in step (1) was mixed with an ammonia bicarbonate solution with a concentration of 100 g/L and ammonia water with a concentration of 150 g/L in the reaction kettle to perform the co-precipitation reaction to obtain a reacted liquid, wherein the mass ratio of the preformed particles, the mixed metal salt, and the precipitating agent was 1:8:16, the stirring was performed at a rotational speed of 400 rpm and a temperature of 65° C. for 50 hours, the pH of the reacted liquid was 8.5, and the solid content of the reacted liquid was 120 g/L.

(4) The obtained reacted material and a sodium hydroxide solution with a pH of 9.0 were mixed and stirred for 1 hour to obtain a primary washed material.

(5) The obtained reacted material was dehydrated by a centrifuge to obtain a primary dehydrated material with a water content not higher than 10 wt %.

(6) The obtained primary dehydrated material was washed by using pure water and dehydrated to obtain a secondary dehydrated material with a water content not higher than 10 wt %.

(7) The obtained secondary dehydrated material was dried and sieved to remove iron to obtain a lithium-rich carbonate precursor with a particle size of 6 wherein the precursor had a chemical formula of $Ni_{0.18}Co_{0.1}Mn_{0.72}CO_3$ and a tap density of 1.5 g/cm³.

The method for preparing a cathode material is as follows:

In Sa, the lithium-rich carbonate precursor obtained in step (8) and lithium hydroxide were mixed according to the molar ratio of 1:1.06, and primary sintering was performed at 500° C. in an air atmosphere for 4 hours to obtain a primary sintered material.

In Sb, the obtained primary sintered material was crushed, and then secondary sintering was performed at 700° C. for 25 hours to obtain a cathode material which had a chemical formula of $Li(Li_{0.2}Ni_{0.14}Co_{0.08}Mn_{0.58})O_2$ and a compaction density of 2.9 g/cm³.

Figure 3:
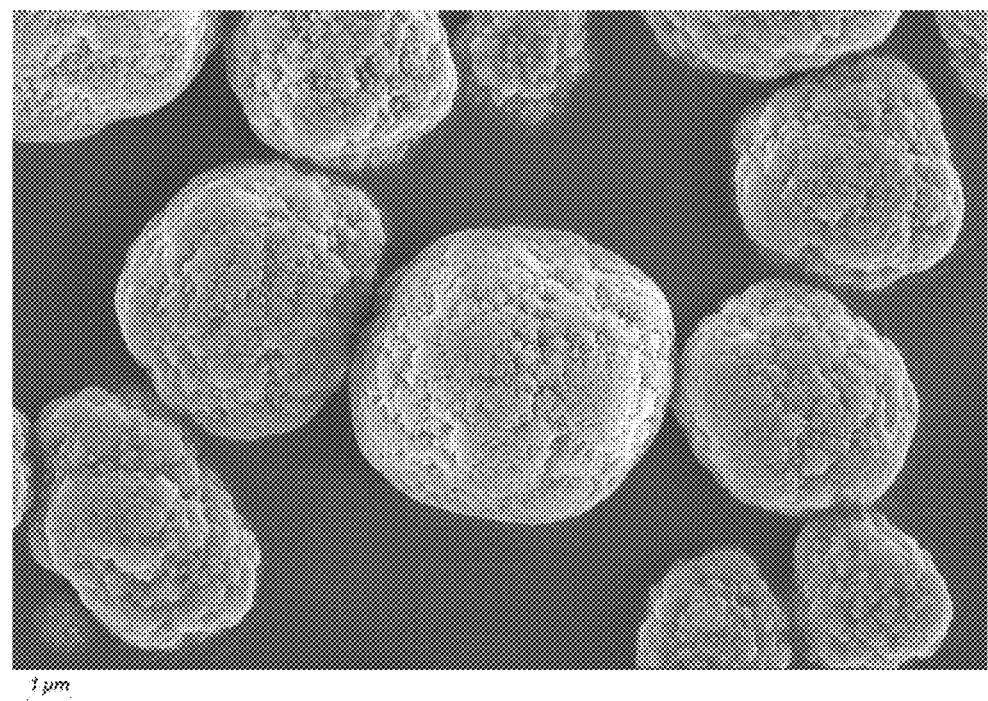
FIG. 3 is a scanning electron microscope graph of a lithium-rich carbonate precursor prepared in an example of the present disclosure.

FIG. 3 is a scanning electron microscope graph of the precursor material obtained in the example of the present disclosure, and it can be seen that the precursor material had a spherical structure, uniform particle size distribution, and a smooth surface. The particle size distribution of the precursor was detected by a laser particle analyzer, and it is further found that the particle size distribution of the precursor was uniform. Meanwhile, it is detected that the content of sodium in the precursor was less than 300 ppm and the content of sulfur was less than 1000 ppm. The cathode material was mixed with the carbon black conductive agent (SP) and polyvinylidene fluoride (PVDF) and then stirred with N-methylpyrrolidone (NMP) as the solvent for several hours to pulp to prepare a lithium-ion half cell. The charge-discharge test was performed by a LAND cell tester at 4.8 V, and the discharge capacity per gram of the product was 300 mAh to 306 mAh at 0.1 C and the discharge capacity was 230 mAh to 240 mAh at 1.0 C.

Example 2

The method for preparing a lithium-rich carbonate precursor is as follows.

(1) Nickel nitrate, cobalt nitrate, and manganese nitrate in a molar ratio of 0.18:0.18:0.64 according to nickel, cobalt, and manganese were mixed to obtain a mixed metal salt in which nickel nitrate, cobalt nitrate, and manganese nitrate were at a concentration of 110 g/L.

(2) In the presence of the protective agent sodium sulfite and the conductive agent fructose, part of the mixed metal salt was mixed with a sodium carbonate solution with a concentration of 200 g/L and ammonia water with a concentration of 120 g/L for rapid reaction (the reaction was completed within 10 seconds, wherein the molar ratio of the mixed metal salt to the precipitating agent was 1:2.5, and based on 1 L of the total amount of mixed metal salt and the precipitating agent, the amount of the protective agent sodium sulfite was 8 g, and the amount of the conductive agent fructose was 50 g). The obtained mixture was stirred at 50° C. and at a stirring speed of 800 rpm for 2 hour, then cooled to the normal temperature, sealed, and allowed to stand for 12 hours to obtain solid preformed particles with a particle size of 3.0 μm.

(3) The obtained preformed particles were added into a reaction kettle as a base solution, and then the mixed metal salt obtained in step (1) was mixed with a sodium carbonate solution with a concentration of 200 g/L and ammonia water with a concentration of 120 g/L in the reaction kettle to perform the co-precipitation reaction to obtain a reacted liquid, wherein the mass ratio of the preformed particles, the mixed metal salt, and the precipitating agent was 1:4.5:11.2, the stirring was performed at a rotational speed of 600 rpm and a temperature of 55° C. for 40 hours, the pH of the reacted liquid was 9.5, and the solid content of the reacted liquid was 180 g/L.

(4) The obtained reacted material and a sodium hydroxide solution with a pH of 9.0 were mixed and stirred for 1 hour to obtain a primary washed material.

(5) The obtained reacted material was dehydrated by a centrifuge to obtain a primary dehydrated material with a water content not higher than 10 wt %.

(6) The obtained primary dehydrated material was washed by using pure water and dehydrated to obtain a secondary dehydrated material with a water content not higher than 10 wt %.

(7) The obtained secondary dehydrated material was dried and sieved to remove iron to obtain a lithium-rich carbonate precursor with a particle size of 5 μm, wherein the precursor had a chemical formula of $Ni_{0.2}Co_{0.2}Mn_{0.6}CO_3$ and a tap density of 1.71 $g/cm^3$.

The method for preparing a cathode material is as follows.

In Sa, the lithium-rich carbonate precursor obtained in step (8) and lithium carbonate were mixed according to the molar ratio of 1:1.02, and primary sintering was performed at 400° C. in an air atmosphere for 6 hours to obtain a primary sintered material.

In Sb, the obtained primary sintered material was crushed, and then secondary sintering was performed at 800° C. for 20 hours to obtain a cathode material which had a chemical formula of $Li(Li_{0.2}Ni_{0.14}Co_{0.14}Mn_{0.52})O_2$ and a compaction density of 3.1 $g/cm^3$.

The precursor material prepared in the example of the present disclosure had a spherical structure, uniform particle size distribution, and a smooth surface. The particle size distribution of the precursor was detected by a laser particle analyzer, and it is further found that the particle size distribution of the precursor was uniform. Meanwhile, it is detected that the content of sodium in the precursor was less than 300 ppm and the content of sulfur was less than 1000 ppm.

The cathode material was mixed with the carbon black conductive agent (SP) and polyvinylidene fluoride (PVDF) and then stirred with N-methylpyrrolidone (NMP) as the solvent for several hours to pulp to prepare a lithium-ion half cell. The charge-discharge test was performed by a LAND cell tester at 4.8 V, and the discharge capacity per gram of the product was 300 mAh to 305 mAh at 0.1 C and the discharge capacity was 230 mAh to 235 mAh at 1.0 C.

Example 3

The method for preparing a lithium-rich carbonate precursor is as follows.

(1) Nickel chloride, cobalt chloride, and manganese chloride in a molar ratio of 0.15:0.15:0.7 according to nickel, cobalt, and manganese were mixed to obtain a mixed metal salt in which nickel chloride, cobalt chloride, and manganese chloride were at a concentration of 120 g/L.

(2) In the presence of the protective agent ascorbic acid and the conductive agent fructose, part of the mixed metal salt was mixed with an ammonium carbonate solution with a concentration of 180 g/L and ammonia water with a concentration of 100 g/L for rapid reaction (the reaction was completed within 10 seconds, wherein the molar ratio of the mixed metal salt to the precipitating agent was 1:3, and based on 1 L of the total amount of mixed metal salt and the precipitating agent, the amount of the protective agent ascorbic acid was 10 g, and the amount of the conductive agent fructose was 20 g). The obtained mixture was stirred at 60° C. and at a stirring speed of 800 rpm for 5 hours, then cooled to the normal temperature, sealed, and allowed to stand for 24 hours to obtain solid preformed particles with a particle size of 3 μm.

(3) The obtained preformed particles were added into a reaction kettle as a base solution, and then the mixed metal salt obtained in step (1) was mixed with an ammonium carbonate solution with a concentration of 180 g/L and ammonia water with a concentration of 100 g/L in the reaction kettle to perform the co-precipitation reaction to obtain a reacted liquid, wherein the mass ratio of the preformed particles, the mixed metal salt, and the precipitating agent was 1:2.4: 7.2, the stirring was performed at a rotational speed of 900 rpm and a temperature of 50° C. for 30 hours, the pH of the reacted liquid was 8, and the solid content of the reacted liquid was 140 g/L.

(4) The obtained reacted material and a sodium hydroxide solution with a pH of 9.0 were mixed and stirred for 1 hour to obtain a primary washed material.

(5) The obtained reacted material was dehydrated by a centrifuge to obtain a primary dehydrated material with a water content not higher than 10 wt %.

(6) The obtained primary dehydrated material was washed by using pure water and dehydrated to obtain a secondary dehydrated material with a water content not higher than 10 wt %.

(7) The obtained secondary dehydrated material was dried and sieved to remove iron to obtain a lithium-rich carbonate precursor with a particle size of 4 μm, wherein the precursor had a chemical formula of $Ni_{0.15}Co_{0.15}Mn_{0.7}CO_3$ and a tap density of 1.6 $g/cm^3$.

The method for preparing a cathode material is as follows.

In Sa, the lithium-rich carbonate precursor obtained in step (8) and lithium hydroxide were mixed according to the molar ratio of 1:1.05, and primary sintering was performed at 450° C. in an air atmosphere for 5 hours to obtain a primary sintered material.

In Sb, the obtained primary sintered material was crushed, and then secondary sintering was performed at 900° C. for 15 hours to obtain a cathode material which had a chemical formula of $Li(Li_{0.2}Ni_{0.12}Co_{0.12}Mn_{0.56})O_2$ and a compaction density of 3.0 $g/cm^3$.

The precursor material prepared in the example of the present disclosure had a spherical structure, uniform particle size distribution, and a smooth surface. The particle size distribution of the precursor was detected by a laser particle analyzer, and it is further found that the particle size distribution of the precursor was uniform. Meanwhile, it is detected that the content of sodium in the precursor was less than 300 ppm and the content of sulfur was less than 1000 ppm. The cathode material was mixed with the carbon black conductive agent (SP) and polyvinylidene fluoride (PVDF) and then stirred with N-methylpyrrolidone (NMP) as the solvent for several hours to pulp to prepare a lithium-ion half cell. The charge-discharge test was performed by a LAND cell tester at 4.8 V, and the discharge capacity per gram of the product was 310 mAh to 315 mAh at 0.1 C and the discharge capacity was 236 mAh to 242 mAh at 1.0 C.

Example 4

The method for preparing a lithium-rich carbonate precursor is as follows.

(1) Nickel sulfate, cobalt sulfate, and manganese sulfate in a molar ratio of 0.1:0.18:0.72 according to nickel, cobalt, and manganese were mixed to obtain a mixed metal salt in which nickel sulfate, cobalt sulfate, and manganese sulfate were at a concentration of 200 g/L.

(2) In the presence of the protective agent sodium sulfite and the conductive agent glucose, part of the mixed metal salt was mixed with a sodium bicarbonate solution with a concentration of 90 g/L and sodium carbonate with a concentration of 170 g/L for rapid reaction (the reaction was completed within 10 seconds, wherein the molar ratio of the mixed metal salt to the precipitating agent was 1:2, and based on 1 L of the total amount of mixed metal salt and the precipitating agent, the amount of the protective agent sodium sulfite was 9 g, and the amount of the conductive agent glucose was 60 g). The obtained mixture was stirred at 55° C. and at a stirring speed of 850 rpm for 3 hours, then cooled to the normal temperature, sealed, and allowed to stand for 18 hours to obtain solid preformed particles with a particle size of 2.8 μm.

(3) The obtained preformed particles were added into a reaction kettle as a base solution, and then the mixed metal salt obtained in step (1) was mixed with a sodium bicarbonate solution with a concentration of 90 g/L and sodium carbonate with a concentration of 170 g/L in the reaction kettle to perform the co-precipitation reaction to obtain a reacted liquid, wherein the mass ratio of the preformed particles, the mixed metal salt, and the precipitating agent was 1:6:12, the stirring was performed at a rotational speed of 1000 rpm and a temperature of 60° C. for 15 hours, the pH of the reacted liquid was 9.5, and the solid content of the reacted liquid was 220 g/L.

(4) The obtained reacted material and a sodium hydroxide solution with a pH of 9.0 were mixed and stirred for 1 hour to obtain a primary washed material.

(5) The obtained reacted material was dehydrated by a centrifuge to obtain a primary dehydrated material with a water content not higher than 10 wt %.

(6) The obtained primary dehydrated material was washed by using pure water and dehydrated to obtain a secondary dehydrated material with a water content not higher than 10 wt %.

(7) The obtained secondary dehydrated material was dried and sieved to remove iron to obtain a lithium-rich carbonate precursor with a particle size of 5 wherein the precursor had a chemical formula of $Ni_{0.1}Co_{0.18}Mn_{0.72}CO_3$ and a tap density of 1.64 g/cm³.

The method for preparing a cathode material is as follows.

In Sa, the lithium-rich carbonate precursor obtained in step (8) and lithium carbonate were mixed according to the molar ratio of 1:1.03, and primary sintering was performed at 600° C. in an air atmosphere for 5 hours to obtain a primary sintered material.

In Sb, the obtained primary sintered material was crushed, and then secondary sintering was performed at 950° C. for 8 hours to obtain a cathode material which had a chemical formula of $Li(Li_{0.2}Ni_{0.08}Co_{0.14}Mn_{0.58})O_2$ and a compaction density of 2.9 g/cm³.

The precursor material prepared in the example of the present disclosure had a spherical structure, uniform particle size distribution, and a smooth surface. The particle size distribution of the precursor was detected by a laser particle analyzer, and it is further found that the particle size distribution of the precursor was uniform. Meanwhile, it is detected that the content of sodium in the precursor was less than 300 ppm and the content of sulfur was less than 1000 ppm.

The cathode material was mixed with the carbon black conductive agent (SP) and polyvinylidene fluoride (PVDF) and then stirred with N-methylpyrrolidone (NMP) as the solvent for several hours to pulp to prepare a lithium-ion half cell. The charge-discharge test was performed by a LAND cell tester at 4.8 V, and the discharge capacity per gram of the product was 304 mAh to 310 mAh at 0.1 C and the discharge capacity was 242 mAh to 248 mAh at 1.0 C.

Example 5

The method for preparing a lithium-rich carbonate precursor is as follows:

(1) Nickel sulfate, cobalt sulfate, and manganese sulfate in a molar ratio of 0.1:0.1:0.8 according to nickel, cobalt, and manganese were mixed to obtain a mixed metal salt in which nickel sulfate, cobalt sulfate, and manganese sulfate were at a concentration of 80 g/L.

(2) In the presence of the protective agent sodium sulfite and the conductive agent glucose, part of the mixed metal salt was mixed with a sodium bicarbonate solution with a concentration of 50 g/L and sodium carbonate with a concentration of 200 g/L for rapid reaction (the reaction was completed within 10 seconds, wherein the molar ratio of the mixed metal salt to the precipitating agent was 1:2, and based on 1 L of the total amount of mixed metal salt and the precipitating agent, the amount of the protective agent sodium sulfite was 1 g, and the amount of the conductive agent glucose was 10 g). The obtained mixture was stirred at 30° C. and at a stirring speed of 1000 rpm for 1 hour, then cooled to the normal temperature, sealed, and allowed to stand for 12 hours to obtain solid preformed particles with a particle size of 1 μm.

(3) The obtained preformed particles were added into a reaction kettle as a base solution, and then the mixed metal salt obtained in step (1) was mixed with a sodium bicarbonate solution with a concentration of 50 g/L and sodium carbonate with a concentration of 200 g/L in the reaction kettle to perform the co-precipitation reaction to obtain a reacted liquid, wherein the mass ratio of the preformed particles, the mixed metal salt, and the precipitating agent was 1:2:6, the stirring was performed at a rotational speed of 400 rpm and a temperature of 70° C. for 5 hours, the pH of the reacted liquid was 8, and the solid content of the reacted liquid was 100 g/L.

(4) The obtained reacted material and a sodium hydroxide solution with a pH of 9.0 were mixed and stirred for 0.1 hour to obtain a primary washed material.

(5) The obtained reacted material was dehydrated by a centrifuge to obtain a primary dehydrated material with a water content not higher than 10 wt %.

(6) The obtained primary dehydrated material was washed by using pure water and dehydrated to obtain a secondary dehydrated material with a water content not higher than 10 wt %.

(7) The obtained secondary dehydrated material was dried and sieved to remove iron to obtain a lithium-rich carbonate precursor with a particle size of 5 wherein the precursor had a chemical formula of $Ni_{0.1}Co_{0.1}Mn_{0.8}CO_3$ and a tap density of 1.72 g/cm³.

The method for preparing a cathode material is as follows.

In Sa, the lithium-rich carbonate precursor obtained in step (8) and lithium carbonate were mixed according to the molar ratio of 1:1.02, and primary sintering was performed at 400° C. in an air atmosphere for 6 hours to obtain a primary sintered material.

In Sb, the obtained primary sintered material was crushed, and then secondary sintering was performed at 700° C. for 25 hours to obtain a cathode material which had a chemical formula of $Li(Li_{0.2}Ni_{0.1}Co_{0.1}Mn_{0.8})O_2$ and a compaction density of 3.0 g/cm³.

The precursor material prepared in the example of the present disclosure had a spherical structure, uniform particle size distribution, and a smooth surface. The particle size distribution of the precursor was detected by a laser particle analyzer, and it is further found that the particle size distribution of the precursor was uniform. Meanwhile, it is detected that the content of sodium in the precursor was less than 300 ppm and the content of sulfur was less than 1000 ppm. The cathode material was mixed with the carbon black conductive agent (SP) and polyvinylidene fluoride (PVDF) and then stirred with N-methylpyrrolidone (NMP) as the solvent for several hours to pulp to prepare a lithium-ion half cell. The charge-discharge test was performed by a LAND cell tester at 4.8 V, and the discharge capacity per gram of the product was 306 mAh to 312 mAh at 0.1 C and the discharge capacity was 236 mAh to 240 mAh at 1.0 C.

Example 6

The method for preparing a lithium-rich carbonate precursor is as follows.

(1) Nickel sulfate, cobalt sulfate, and manganese sulfate in a molar ratio of 0.25:0.25:0.5 according to nickel, cobalt, and manganese were mixed to obtain a mixed metal salt in which nickel sulfate, cobalt sulfate, and manganese sulfate were at a concentration of 130 g/L.

(2) In the presence of the protective agent sodium sulfite and the conductive agent glucose, part of the mixed metal salt was mixed with an ammonium bicarbonate solution with a concentration of 50 g/L and an ammonium carbonate solution with a concentration of 150 g/L for rapid reaction (the reaction was completed within 10 seconds, wherein the molar ratio of the mixed metal salt to the precipitating agent was 1:3.5, and based on 1 L of the total amount of mixed metal salt and the precipitating agent, the amount of the protective agent sodium sulfite was 20 g, and the amount of the conductive agent glucose was 100 g). The obtained mixture was stirred at 60° C. and at a stirring speed of 800 rpm for 5 hours, then cooled to the normal temperature, sealed, and allowed to stand for 24 hours to obtain solid preformed particles with a particle size of 3 μm.

(3) The obtained preformed particles were added into a reaction kettle as a base solution, and then the mixed metal salt obtained in step (1) was mixed with an ammonium bicarbonate solution with a concentration of 50 g/L and an ammonium carbonate solution with a concentration of 150 g/L in the reaction kettle to perform the co-precipitation reaction to obtain a reacted liquid, wherein the mass ratio of the preformed particles, the mixed metal salt, and the precipitating agent was 1:8:20, the stirring was performed at a rotational speed of 1000 rpm and a temperature of 50° C. for 60 hours, the pH of the reacted liquid was 9.5, and the solid content of the reacted liquid was 300 g/L.

(4) The obtained reacted material and a sodium hydroxide solution with a pH of 9.0 were mixed and stirred for 5 hours to obtain a primary washed material.

(5) The obtained reacted material was dehydrated by a centrifuge to obtain a primary dehydrated material with a water content not higher than 10 wt %.

(6) The obtained primary dehydrated material was washed by using pure water and dehydrated to obtain a secondary dehydrated material with a water content not higher than 10 wt %.

(7) The obtained secondary dehydrated material was dried and sieved to remove iron to obtain a lithium-rich carbonate precursor with a particle size of 6 μm, wherein the precursor had a chemical formula of $Ni_{0.25}Co_{0.25}Mn_{0.5}CO_3$ and a tap density of 1.47 g/cm³.

The method for preparing a cathode material is as follows. In Sa, the lithium-rich carbonate precursor obtained in step (8) and lithium carbonate were mixed according to the molar ratio of 1:1.08, and primary sintering was performed at 600° C. in an air atmosphere for 4 hours to obtain a primary sintered material.

In Sb, the obtained primary sintered material was crushed, and then secondary sintering was performed at 950° C. for 8 hours to obtain a cathode material which had a chemical formula of $Li(Li_{0.2}Ni_{0.25}Co_{0.25}Mn_{0.5})O_2$ and a compaction density of 2.6 g/cm³.

The precursor material prepared in the example of the present disclosure had a spherical structure, uniform particle size distribution, and a smooth surface. The particle size distribution of the precursor was detected by a laser particle analyzer, and it is further found that the particle size distribution of the precursor was uniform. Meanwhile, it is detected that the content of sodium in the precursor was less than 300 ppm and the content of sulfur was less than 1000 ppm. The cathode material was mixed with the carbon black conductive agent (SP) and polyvinylidene fluoride (PVDF) and then stirred with N-methylpyrrolidone (NMP) as the solvent for several hours to pulp to prepare a lithium-ion half cell. The charge-discharge test was performed by a LAND cell tester at 4.8 V, and the discharge capacity per gram of the product was 308 mAh to 315 mAh at 0.1 C and the discharge capacity was 235 mAh to 245 mAh at 1.0 C.

What is claimed is:

1. A method for preparing a lithium-rich carbonate precursor comprising:

(1) mixing a soluble nickel salt, a soluble cobalt salt, and a soluble manganese salt to obtain a mixed metal salt;

(2) mixing part of the mixed metal salt with a precipitating agent in the presence of a protective agent and a conductive agent to obtain a mixture, performing stirring at a predetermined temperature according to a predetermined stirring speed, lowering temperature from the predetermined temperature to a normal temperature, and sealing the mixture and allowing to stand, so as to obtain preformed particles;

(3) with stirring, mixing the preformed particles, another part of the mixed metal salt, and the precipitating agent to perform a co-precipitation reaction to obtain a reacted material;

(4) with stirring, mixing the reacted material and a detergent to obtain a primary washed material;

(5) performing primary dehydration on the primary washed material to obtain a primary dehydrated material;

(6) with stirring, performing second washing and dehydration on the primary dehydrated material respectively to obtain a secondary dehydrated material; and (7) drying the secondary dehydrated material to obtain a dried secondary dehydrated material, and sieving the dried secondary dehydrated material to remove iron to obtain a lithium-rich carbonate precursor;

wherein the lithium-rich carbonate precursor has a solid spherical structure and has a chemical formula of $Ni_xCo_yMn_{(1-x-y)}CO_3$, wherein x is 0.1 to 0.25, and y is 0.1 to 0.25.

2. The method according to claim 1, wherein, in step (1), the soluble nickel salt, the soluble cobalt salt, and the soluble manganese salt are in a molar ratio of (0.1 to 0.25):(0.1 to 0.25):(0.5 to 0.8) according to nickel, cobalt, and manganese.

3. The method according to claim 1, wherein, in step (1), the soluble nickel salt, the soluble cobalt salt, and the soluble manganese salt in the mixed metal salt are each independently at a concentration of 80 g/L to 130 g/L.

4. The method according to claim 1, wherein, in step (1), the soluble nickel salt is at least one selected from the group consisting of nickel chloride, nickel nitrate, and nickel sulfate;

the soluble cobalt salt is at least one selected from the group consisting of cobalt chloride, cobalt nitrate, and cobalt sulfate; and the soluble manganese salt is at least one selected from the group consisting of manganese chloride, manganese nitrate, and manganese sulfate.

5. The method according to claim 1, wherein, in step (2), the protective agent is at least one selected from the group consisting of ascorbic acid and sodium sulfite.

6. The method according to claim 1, wherein, in step (2), the conductive agent is at least one selected from the group consisting of glucose and fructose.

7. The method according to claims 1, wherein, in step (2), the mixed metal salt and the precipitating agent are in a molar ratio of 1:(2.0 to 3.5).

8. The method according to claim 1, wherein, in step (2), based on 1 L of the total amount of the mixed metal salt and the precipitating agent, the protective agent is used in an amount of 1 g to 20 g, and the conductive agent is used in an amount of 10 g to 100 g.

9. The method according to claim 1, wherein, in step (2), the precipitating agent is at least one selected from the group consisting of sodium carbonate, sodium bicarbonate, ammonium carbonate, ammonium bicarbonate, and ammonia water;

optionally the sodium carbonate is at a concentration of 50 g/L to 200 g/L;

optionally the sodium bicarbonate is at a concentration of 50 g/L to 100 g/L;

optionally the ammonium carbonate is at a concentration of 150 g/L to 200 g/L;

optionally the ammonium bicarbonate is at a concentration of 50 g/L to 200 g/L; and optionally the ammonia water is at a concentration of 50 g/L to 200 g/L.

10. The method according to claim 1, wherein, in step (2), the preformed particles have a particle size of 1 μm to 3 μm.

11. The method according to claim 1, wherein, in step (3), the preformed particles, the mixed metal salt, and the precipitating agent are in a mass ratio of 1:(2 to 8):(6 to 20);

wherein in step (3), the stirring is performed at a rotational speed of 400 rpm to 1000 rpm and at a temperature of 50° C. to 70° C. for 5 hours to 60 hours, the reacted material has a pH of 8 to 9.5, and solid content of the reacted material is 100 g/L to 300 g/L.

* * * * *